United States Patent
Schoenfeld et al.

(10) Patent No.: US 9,303,826 B2
(45) Date of Patent: Apr. 5, 2016

(54) LED BACKLIGHT APPARATUS AND METHOD

(71) Applicant: UNIVERSITY OF CENTRAL FLORIDA RESEARCH FOUNDATION, INC., Orlando, FL (US)

(72) Inventors: Winston V. Schoenfeld, Oviedo, FL (US); Huiyang Zhou, Cary, NC (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 14/608,562

(22) Filed: Jan. 29, 2015

(65) Prior Publication Data

US 2016/0010807 A1    Jan. 14, 2016

Related U.S. Application Data

(62) Division of application No. 13/091,616, filed on Apr. 21, 2011, now abandoned.

(60) Provisional application No. 61/326,284, filed on Apr. 21, 2010.

(51) Int. Cl.
| | |
|---|---|
| *F21K 99/00* | (2010.01) |
| *F21V 23/00* | (2015.01) |
| *G02F 1/1335* | (2006.01) |
| *G09G 3/34* | (2006.01) |
| *F21Y 113/00* | (2006.01) |

(52) U.S. Cl.
CPC ............... *F21K 9/30* (2013.01); *F21V 23/003* (2013.01); *G02F 1/133603* (2013.01); *G09G 3/3426* (2013.01); *F21Y 2113/005* (2013.01); *G09G 2320/0233* (2013.01)

(58) Field of Classification Search
None
See application file for complete search history.

(56) References Cited

U.S. PATENT DOCUMENTS

| | | |
|---|---|---|
| 7,595,784 B2 | 9/2009 | Yamamoto et al. |
| 7,782,283 B2 | 8/2010 | Hong et al. |
| 2006/0007112 A1 | 1/2006 | Park |

FOREIGN PATENT DOCUMENTS

WO    WO2010/020949    2/2010

*Primary Examiner* — Michael Teitelbaum
(74) *Attorney, Agent, or Firm* — William Greener; Alek P. Szecsy; Bond, Schoeneck & King, PLLC

(57) ABSTRACT

Backlit video display systems where the backlights (for example, LED backlights) are controlled based at least in part on the content of the video signal of the video that is being displayed by the backlit video display system. The system can provide specific control of the three primary colors (for example, red, green and blue LEDs). The system can provide content-based control in a spatial mode. The system is a smart backlighting system with content-based controls at the following levels: (i) spectral, (ii) spatial, and (iii) temporal control. Also, some embodiments may provide a novel way of providing a backlit video display system with night vision (NV) capability through a unique four LED chip architecture.

5 Claims, 11 Drawing Sheets

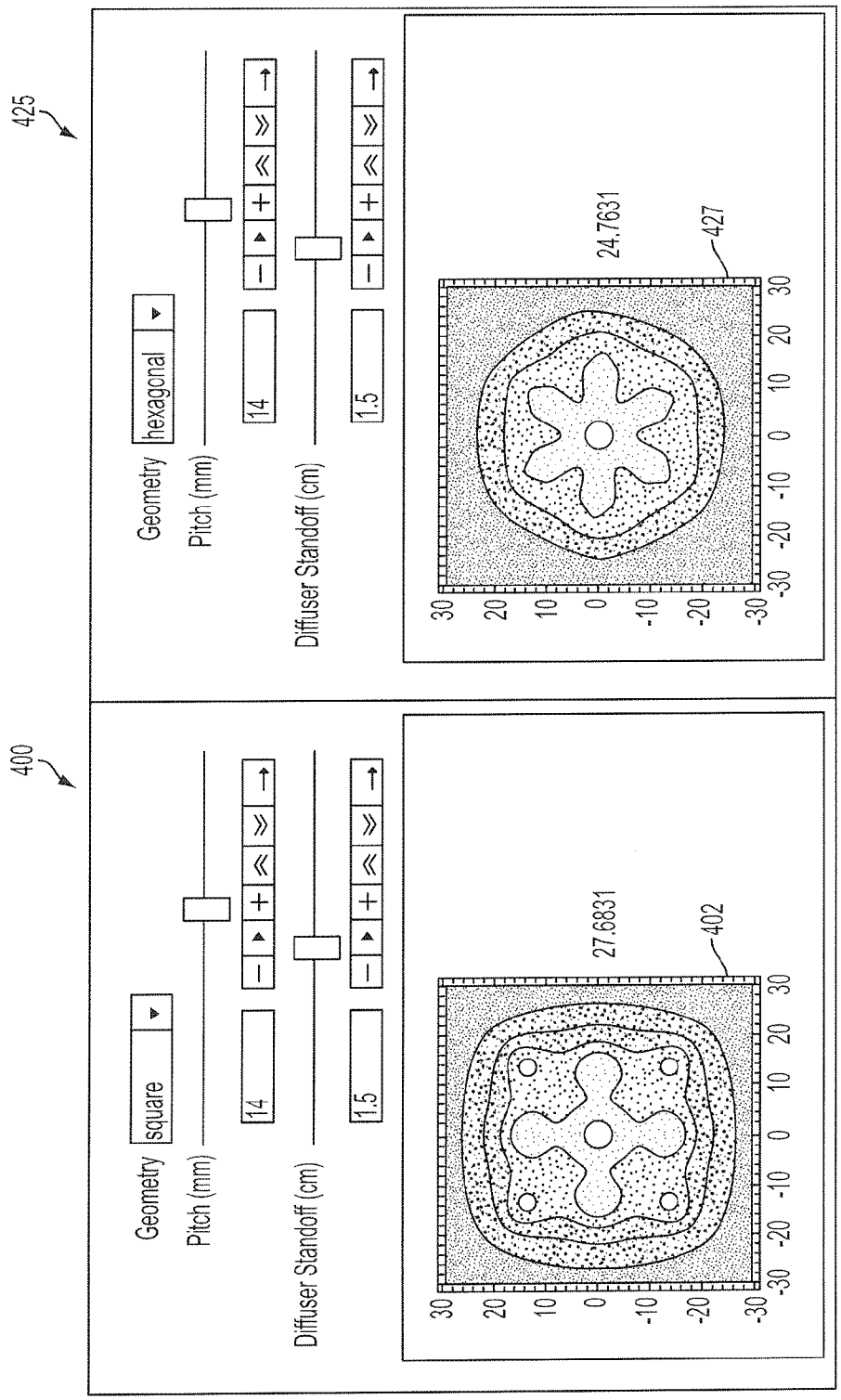

LED BACKLIGHT APPARATUS AND METHOD

RELATED APPLICATION

The present application is a divisional of U.S. application Ser. No. 13/091,616 filed Apr. 21, 2011, which claims priority to U.S. provisional patent application No. 61/326,284, filed on Apr. 21, 2010; all of the foregoing patent-related document(s) are hereby incorporated by reference herein in their respective entirety(ies).

FEDERALLY SPONSORED RESEARCH

Funding for the disclosed invention was provided by the DoD SBIR FY07.1, Navy 07-028, High Performance/Reliability Display Backlighting, Naval Air Warfare Center—Aircraft Division, Phase I Contract No. to PICO: N 68335-07-C-0299, Phase II Contract No. to PICO: N 68335-08-C-0232. The U.S. government has certain rights in the invention.

BACKGROUND OF THE INVENTION

1. Field of the Invention

The present invention relates to backlighting for backlit video display devices and more particularly to backlighting for liquid crystal display (LCD) devices and light emitting diode (LED) backlighting for backlighted video displays.

2. Description of the Related Art

Current two dimensional (2D) LED backlit active matrix LCD (AMLCD) displays developed for military applications use utilize standard white LEDs employing a blue LED and Yttrium Aluminum Garnet (YAG) phosphor that are not actively controlled and adjusted to the incoming video stream. In this respect, these backlit video display systems are similar to current commercial displays employing LEDs. Additionally, current military displays employ a separate and costly NVIS filter. This NVIS filter is required for night vision compatibility.

The following published documents may also include helpful background information: (i) US patent publication 2006/0007112 ("Park"); and/or (ii) U.S. Pat. No. 7,782,283 ("Hong"), the subject matters of which are incorporated herein by reference in their entireties.

Description of the Related Art Section Disclaimer: To the extent that specific publications are discussed above in this Description of the Related Art Section, these discussions should not be taken as an admission that the discussed publications (for example, published applications or patents) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, they are all hereby incorporated by reference into this document in their respective entirety(ies).

BRIEF SUMMARY OF THE INVENTION

The current invention recognizes that the currently-popular white LED platform has certain undesirable limitations.

One aspect of the present invention is directed to control of the backlights (for example, LED backlights) based on the content of the video signal of the video that is being displayed by the backlit video display system. For example, the present invention can provide specific control of the independent red, green, and blue LEDs. As a further example, the present invention can provide content-based control in a spatial mode. Some embodiments provide a smart backlighting system with content-based controls at the following levels: (i) spectral, (ii) spatial, and (iii) temporal control.

Another aspect of the present invention relates to a novel way of providing a backlit video display system with night vision (NV) capability through a unique four LED chip architecture.

Some embodiments of the present invention may exhibit one or more of the following objects, features and/or advantages:

(i) a DGC backlight system that represents a significant advancement beyond the currently used CCFL systems and the LED based systems in development by others;

(ii) a DGC backlight system with active spatial control, both temporally and spectrally, of the RGB LED array in response to the real-time video stream being displayed on a backlit display;

(iii) a level of active control that enables significant advancements beyond current display performance while remaining scalable and retrofit compatible;

(iv) Greater luminance range (0-400 fL);

(v) Greater than 90% luminance uniformity across entire display area;

(vi) Full scale (square root) user adjustment of luminance with no color shift (<0.020 CIE 1976 radius);

(vii) Enhanced color gamut (100% National Television Standards Committee) with greater color saturation;

(viii) Improved temperature and chromaticity;

(ix) Significantly higher contrast ratio at all luminance levels (>10,000:1), Greatly increased contrast for improved readability;

(x) Improved reliability and extended Mean Time Between Failure (>15,000 Hrs);

(xi) Reduced turn-on time (no warm-up time for LED array);

(xii) Decreased power consumption and lower heat levels;

(xiii) Eliminates high voltages issues arising from CCFL operation;

(xiv) Reduced overall production and maintenance cost;

(xv) Fail safe system with algorithms, electronics, and LEDs;

(xvi) NVIS filter possibly no longer required;

(xvii) Increased ruggedness, All solid-state with no filaments;

(xviii) Reduces overall number of display unit boards: creates a lower overall unit cost;

(xix) Allows for technology improvements with minimal redesign, Retrofit compatibility;

(xx) Contains no mercury/Restriction of Hazardous Substances (RoHS) Compliant;

(xxi) display system suitable for use in traffic control;

(xxii) display system suitable for use in gaming;

(xxiii) display system suitable for use in audio control;

(xxiv) display system suitable for use in High Definition Television;

(xxv) display system suitable for use in high performance informational displays;

(xxvi) display system suitable for use in medical imaging systems for precise diagnosis and less invasive surgery;

(xxvii) display system suitable for use in computer monitors for realistic training;

(xxviii) display system suitable for use in unmanned military aerial vehicles on surveillance and attack missions;

(xxix) display system suitable for use in border surveillance and security (xxx) display system suitable for use in environmental monitoring;

(xxxi) display system suitable for use in agricultural surveillance of crops for harvesting readiness;

(xxxii) display system suitable for use in high performance computer monitors;

(xxxiii) display system suitable for use in medical imaging systems;

(xxxiv) display system suitable for use in high-definition televisions; and/or (xxxv) remove costly NVIS filter from the backlit video display through a unique four LED chip approach; and/or (xxxvi) due to the increased luminance capability, consequent improvements on the limited viewing issues of current displays in extreme environmental conditions, such as blinding sunlight.

BRIEF DESCRIPTION OF THE DRAWINGS

The present invention will be more fully understood and appreciated by reading the following Detailed Description in conjunction with the accompanying drawings, in which:

FIG. 10 is a screenshot used to develop embodiments of the present invention;

FIG. 11 is a screenshot used to develop embodiments of the present invention;

DETAILED DESCRIPTION OF THE INVENTION

Figure 1:
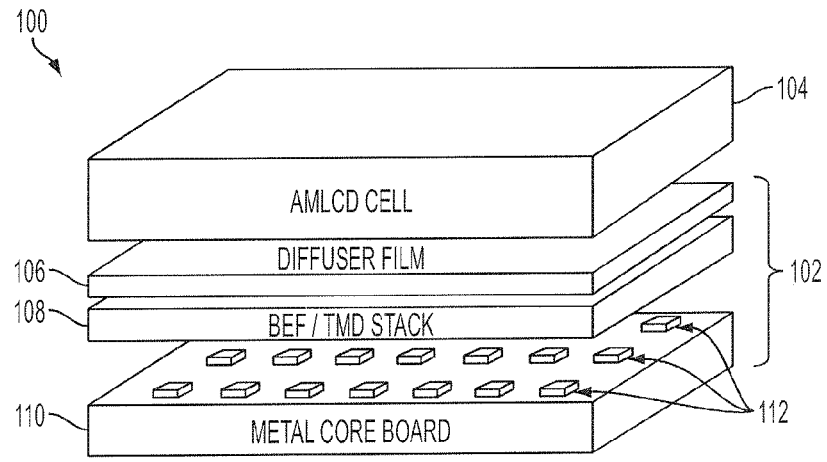
FIG. 1 is a perspective view of a first embodiment of a front plane optical assembly according to the present invention.

Some embodiments of the present invention are smart, dynamic, 'Digital Geographic Control' (DGC) backlight devices and/or methods. "Smart" backlighting means "active control" technology. Active control technology applies to a backlight display having individually controlled primary colored lights (for example, red green and blue LEDs) directly in back of a backlit display (for example, an active matrix liquid crystal display). The active control technology controls the individually controlled primary colored lights to synchronize backlighting illumination with display imagery, producing clear pictures with very high contrast. While this document will speak in terms of red, green and blue ("RGB") as the primary colors, other primary color schemes may be possible, now and/or in the future. While this document will generally refer to liquid crystal displays, and more specifically active matrix liquid crystal displays ("AMLCD") as the backlit display, the devices and/or methods of the present invention may apply to other types of backlit video displays, now known or to be developed in the future, that require backlighting in a manner similar to an LCD video display.

Some embodiments of designs according to the present invention may include one or more of the following features: (i) an LED array; (ii) control and DGC electronics; (iii) software, (iv) firmware, and (vi) mechanical packaging. In some embodiments, the device of the present invention will fit snugly behind an existing LCD. Some embodiments include a frontplane (the LED array), and a backplane (the controlling electronics) that is integrated with the data stream illuminating the display itself. The LED frontplane provides the AMLCD illumination, while the backplane handles the video input algorithms and LED frontplane pixel control in real time.

Embodiments of the present invention will generally employ a set of primary color backlights, where the colors can be separately controlled, rather than white backlighting. For example, some embodiments will control Red Green Blue (RGB) LEDs, rather than the standard white LEDs that employ a blue LED and Yttrium Aluminum Garnet (YAG) phosphor. Use of separate primary color lighting sources allows independent control of the color of each LED independent of the AMLCD.

Through the DGC (Digital Geographic Control) interface, some embodiments of backlit video displays according to the present invention are able to realize a luminance range of 0.0-400 footlambert (fL) through pulse width modulation control of the LED array.

Some embodiments include a four chip LED that enables NVIS (night vision imaging system) compatibility, having a spectral radiance of less than $2.2 \times 10^{-9}$ W/(sr-cm$^2$), without the need of the standard NVIS filters used in current displays.

In some embodiments, the red LED can be shifted in its output wavelength(s) closer to amber color in order to take it out of or away from the gain curve of NV goggles. Some embodiments use a fourth LED chip (for example, three RGB chips plus a "night-mode" alternate red chip), with the night mode chip at least controlling operation when one or more of the primary colors is adjusted for use with NV goggles. For example, typically the red LED will use a shorter wavelength when NV goggles are to be used.

Some embodiments include a 2D array design that allows an operator the ability to see her entire screen in blinding sunlight or to hone in on life-saving information by quickly switching off portions of the display.

Some embodiments will include an additional unique and potentially advantageous feature of the DGC backlight in the form of a built-in fault recovery system. The built in recovery fault system allows the operator a fail-safe mode of continuous backlight during critical situations, and will sometimes herein be referred to as a "watch-dog".

Some embodiments use additional LEDs around the perimeter of the backlit video display to mitigate edge effects that are a common problem in other 2D LED backlight systems. These LEDs may be driven by the same signal as their neighbor LEDs to avoid additional electronics. According to the applicable ANSI standards, luminance uniformity is measured over the central 70% of the backlit video display. However, it has now been recognized that military applications will benefit from >90% uniformity. The display is position optimized for maximum uniformity around edge of display. For determining luminance performance of a backlit video display, luminance characteristics can be measured with a luminance camera as known in art.

As shown in FIG. 1, front plane optical assembly 100 includes: DGC optical plane assembly 102 and AMLCD cell 104. DGC optical plane sub-assembly includes: diffuser film 106; BEF/TMS stack 108; metal core board 110; and LEDs 112.

Frontplane Optical System Design Specifications are generally considered by designers in designing backlit video display devices. The selection of the proper LED format relies heavily on two of the backlight requirements: (i) output intensity, or luminance of the display; and (ii) luminance uniformity across the DGC backlight. Assembly 100 is designed to provide an optical frontplane with the following properties: (i) Luminance>350 fL; (ii) Luminance range: 0.0-400 fL; (iii) Time response: <20 msec; and (iv) Luminance uniformity>90% (this greatly exceeds VISA standards); (v) Color-gamut: 100% NTSC; (vi) Color Temperature: 6500K; (vii) Contrast ratio: >10,000:1. Assembly 100 includes a metal core board substrate for maximum heat dissipation, populated with Surface Mount Device (SMD) white LEDs in a 9×12 array, with additional perimeter LEDs around the edges constituting a total of 150 LEDs on an 18 mm pitch. Each white LED may include: (i) a blue LED and a yellow phosphor; or (ii) a UV LED and 3 phosphors; or (iii) an RGB chip in each LED. BEF/TMD 108 is a Brightness Enhancement Films/Tailored MicroDiffuser (BEF/TMD) film. BEF/TMD film 108 can reduce high angle emission from the display, while providing increased uniformity, thus increasing the viewing angle brightness. In some embodiments, RGB LEDs are used in order to provide the greatest level of color contrast control, algorithm compatibility and NVIS compliance. The number of LEDs per pitch can be based on uniformity without necessitating a massively thick stack, which is from the perspective of optimizing stand-off distance.

The actual make-up of the BEF/TMD 108 and diffuser 106 is something that has currently optimized in prototype fabrication and testing. The overall resolution of the AMLCD display will remain fixed by AMLCD cell 104, and is not affected by the DGC backlight density or the 18 mm pitch. The estimated thickness of the designed backlight is expected to be on the order of ⅜ inch for the optical plane, making the total thickness of the display possibly less than 1 inch. The expected luminance of the display is 400 fL, with a contrast ratio of >10,000:1. Furthermore, the array can be driven in a pulse-width modulation scheme that provides the necessary dynamic control of the display luminance while maintaining the necessary color temperature quality and stability.

Figure 2:
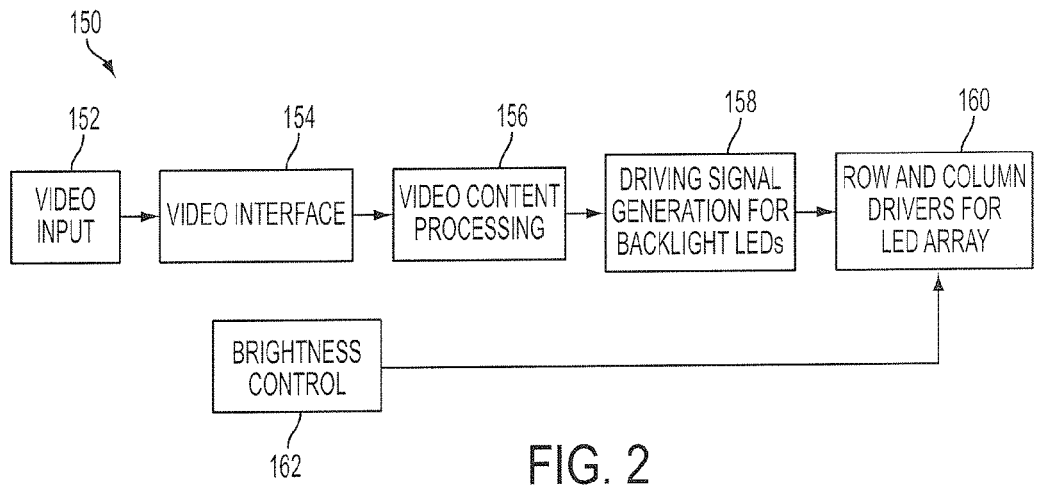
FIG. 2 is a block diagram of a first embodiment of a DGC circuitry sub-system according to the present invention.

FIG. 2 shows a DGC circuitry sub-system 150 including: video input module 152; video interface 154; video content processing module 156; driving signal generation for backlight LEDs module 158; row and column drivers for LED array module 160; and brightness control module 162.

Electronic System Backplane Design Specifications are generally considered when designing the DGC circuitry sub-system. DGC circuitry sub-system 150 processes the video content and determines the appropriate brightness for the backlight LEDs based on the video content. In addition, it takes user inputs to adjust the backlight brightness. The overall architecture of the DGC circuitry is shown in FIG. 2. Some characteristics of interest of the electronic backplane design include the following: (i) Structure of the control circuit; (ii) Display processing algorithm; (iii) Refresh rate; (iv) Response time to the input; (v) Scalability; (vi) DC operating voltage per chip type; and (vii) Fail safe mode.

Figure 3:
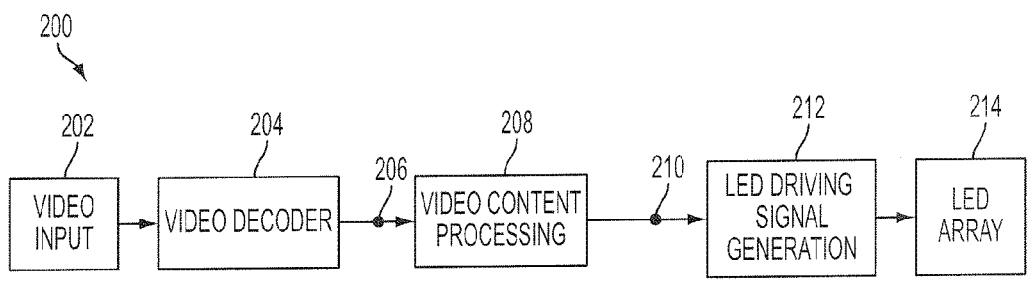
FIG. 3 is a block diagram of a first embodiment of an electronics sub-system according to the present invention.

FIG. 3 shows electronics sub-system 200 including: video input module 202; video decoder module 204 (sometimes referred to as the VGA filter); digitized video communication path 206; video content processing module 208; brightness information communication path 210; LED driving signal generation module 212; and LED array module 214.

A general description of the "Watchdog" for failsafe operation will now be provided. The sub-system implements two watch dogs at two different stages of video signal processing. A watchdog is a hardware mechanism to periodically check the status of the system. The first watchdog only monitors which program phase the NIOS2 CPU is working on. The purpose of this watchdog is to ensure that the CPU responds to most current video input sync. This watchdog is cleared, or "fed," only when the CPU has done with processing of the current buffered video data. If for any reason the CPU has bogged at a certain point of the program, then this watchdog will not be fed timely. The "hungry dog" will send a RESET signal to the entire FPGA (Field-programmable Gate Array) system. The CPU is hence rebooted and re-synced with the video input. If the video decoder fails, this watchdog will not send a signal to the LED driver controller to notify of such failure.

In the second watchdog, which is deployed at the microcontroller for controlling LED driver chips, the output of the video content processing unit is monitored. If the microcontroller does not receive any signal from the video content processing unit, it will turn on all backlight LEDs to ensure that the display is not affected.

Block diagrams and associated methods used in electronics sub-system 200 will now be discussed. The algorithms used in each module are as follows: (i) Video decoder 204 digitizes the video signal in received from video input 202; and (ii) Video content processing 208 runs algorithm to determine the LED brightness levels.

Figure 4:
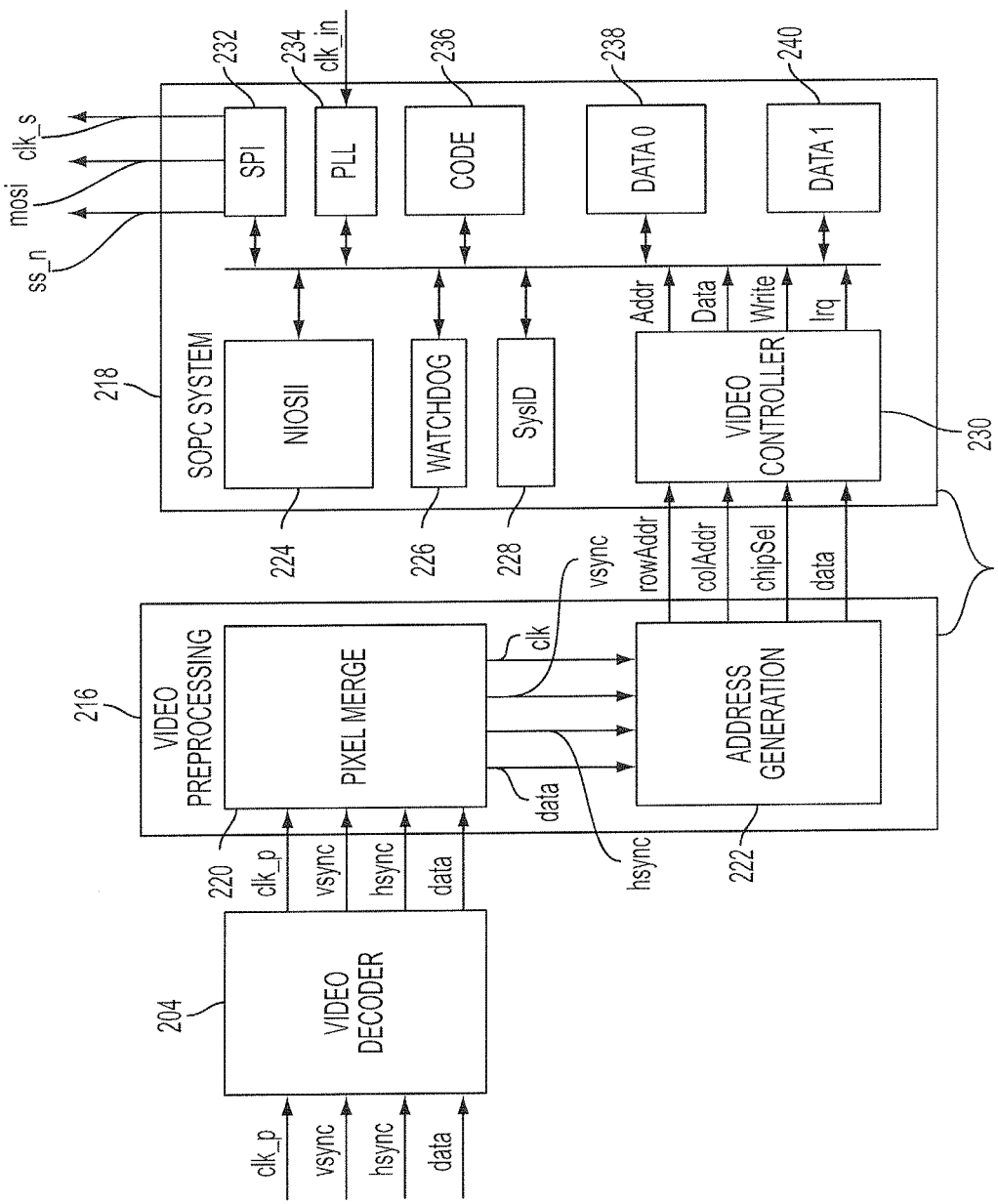
FIG. 4 is a block diagram of a portion of the first embodiment electronics sub-system.

FIG. 4 shows video decoder module 204 and video content processing module 208 in more detail. As shown in FIG. 4, video content processing module 208 includes: video pre-processing sub-module 216 (also sometimes referred to as the universal sub-sampling sub-module); and SOPC sub-module 218. Video preprocessing sub-module 216 includes: pixel merge sub-sub-module 220; and address generation sub-sub-module 222. SOPC sub-module 218 includes: NIOSII sub-sub-module 224; watchdog sub-sub-module 226; SysID sub-sub-module 228; video controller sub-sub-module 230; SPI sub-sub-module 232; phase lock loop (PLL) sub-sub-module 234; code sub-sub-module 236; data0 sub-sub-module 238; and data1 sub-sub-module 240.

Video preprocessing sub-module 216 is responsible for sub-sampling the input video stream to a resolution which the computation capacity of NIOS2 224 can accommodate. Pixel merge sub-sub-module 220 averages four adjacent pixels in the same row. Then, Address Generation sub-sub-module 222 sends one of three continuous rows to downstream video controller 230. Thus, the input video is reduced by a factor of 12 (4 horizontally and 3 vertically). A vector addition instruction is added to NIOSII 224 to accelerate video content processing. At the moment, both implemented video content processing algorithms require to calculate the sum of a number of pixels and then the averages. Since the three color channels are packed in a 32-bit word, in order to process one pixel the processor needs to first separate color data and then perform addition on each color. This results in a sequence of more than ten instructions, which are serially executed without vector addition, taking a large bulk of processor time. The vector adder, on the other hand, performs color separation and addition in parallel by hardware. It only needs the pixel word and function code from NIOSII 224, thereby reducing the processing of a pixel to one single instruction.

Figure 5:
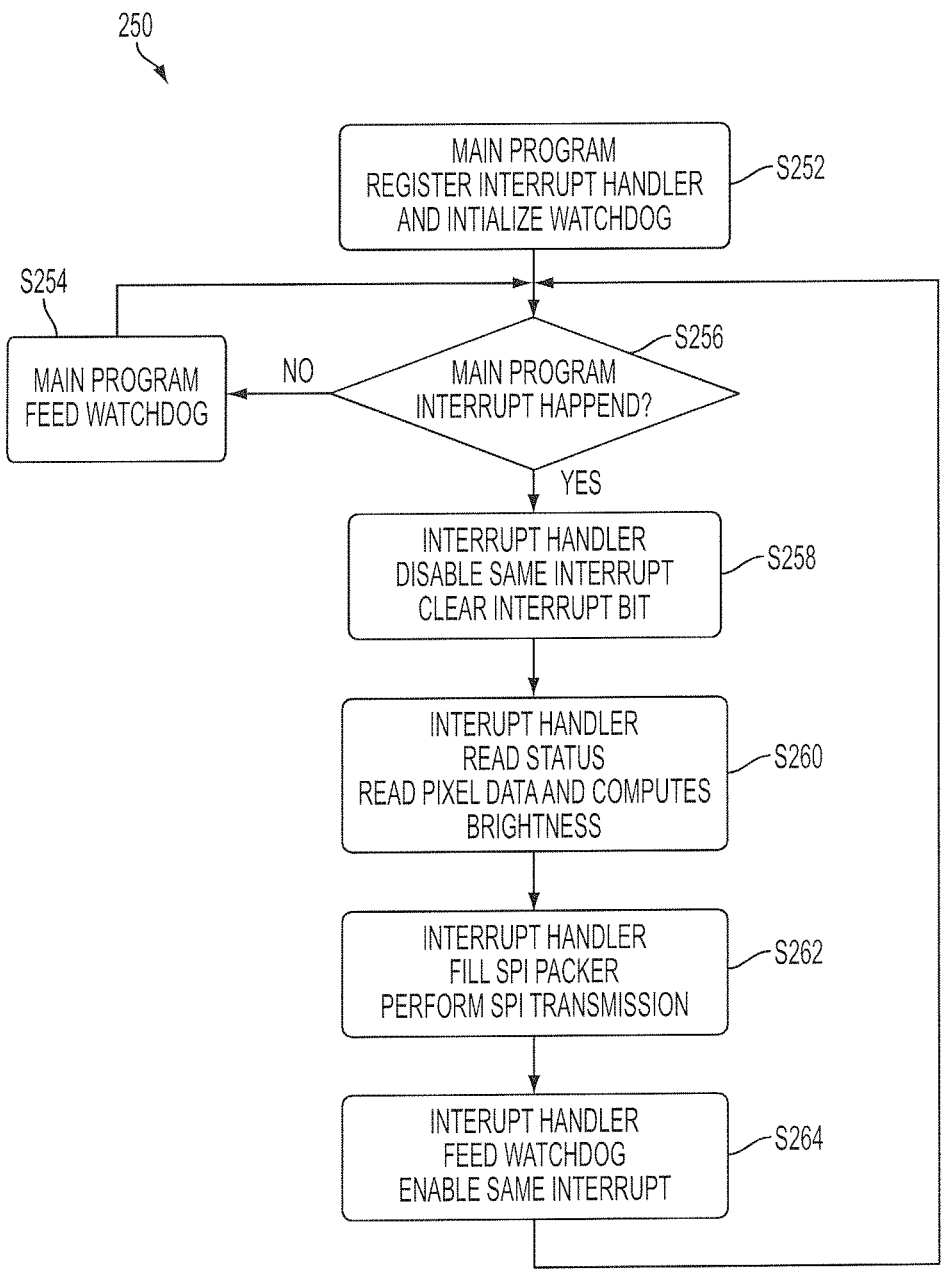
FIG. 5 is a flowchart of a first embodiment of a method according to the present invention.
Figure 6:
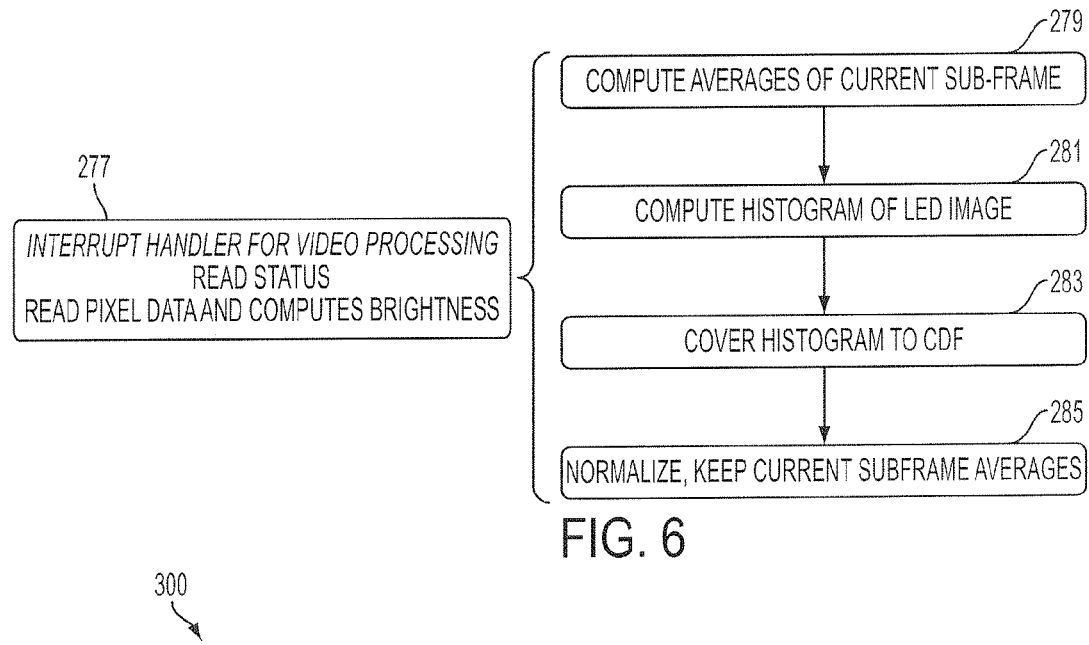
FIG. 6 is a block diagram of a first embodiment of interrupt handler software according to the present invention.

FIG. 5 shows a software algorithm 250 representing the overall software architecture, and includes steps S252, S254, S256, S258, S260, S262 and S264 having a process flow as shown in FIG. 5. FIG. 6 shows a portion of the video processing program called interrupt hander module 277. Interrupt handler 277 is for video processing, reading status, reading pixel data and computing brightness. Interrupt handler module 277 includes: compute averages of current sub-frame sub-module 279; compute histogram of LED image sub-module 281; convert histogram to CDF sub-module 283; and normalize and keep current sub-frame averages sub-module 285.

As shown in FIG. 6, the first step of video content processing is computing regional averages of the current sub-frame by sub-module 279. The pixel averaging algorithm stops here and the resultant regional averages are the LED brightness information sent through SPI sub-sub-module 232 (see FIG. 4). In the histogram equalization algorithm performed by compute histogram sub-module 281, after the first step, the histogram of regional averages is collected. Further background on histogram equalization is provided at http://en.wikipedia.org/wiki/Histogram_equalization (herein incorporated by reference in its entirety). For regional averages belonging to sub-frames other than the current sub-frame, such average values are kept from processing of their corresponding sub-frames and used here. Then the histogram is converted to Cumulative Distribution Function (CDF) by sub-module 283. Finally, sub-module 285 normalizes regional averages of the current sub-frame according to the following known equation, producing the LED brightness information for the current sub-frame:

$$h(v) = \text{round}\left(\frac{cdf(v) - cdf_{min}}{(M \times N) - cdf_{min}} \times (L-1)\right) \quad \text{Equation (1)}$$

Where $cdf_{min}$ is the minimum value of the cumulative distribution function, M×N gives the image's number of pixels and L is the number of grey levels used (in most cases, like this one, 256). Alternatively, other normalization equations (now known or to be developed in the future) may be used for normalization. At the same time, regional averages of the current sub-frame are kept for use in future invocations of interrupt handler.

LED driving signal generation module 212 (shown in FIG. 3) will now be discussed. Module 212 sets the PWM level for all LEDs based on brightness levels that have been determined by algorithm. More specifically, module 212 mainly performs the following tasks: (i) communicating with the video content processing unit with the Serial Peripheral Interface (SPI); and (ii) refreshing the LED drivers based on the brightness data received over SPI.

The optical System will now be discussed. In some embodiments, the optical system will include an array of RGB LEDs and associated optical films that are to be placed in proximity to the LED array, prior to the AMLCD glass and polarizing films. In this discussion there will be a condensed update on the optical system design activities and a discussion of potential methods for removal of the NVIS external filter.

Figure 7:
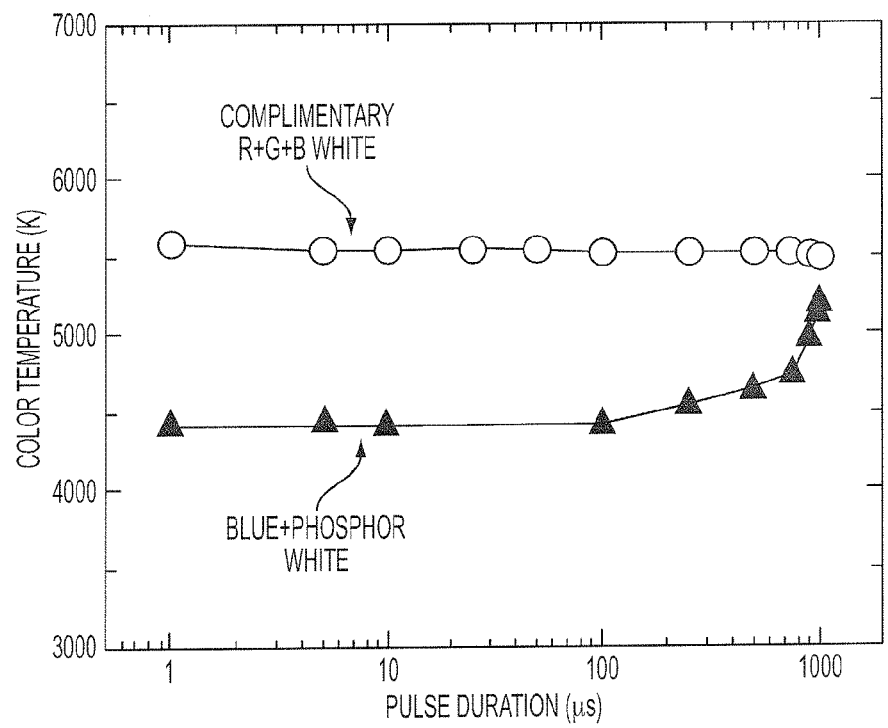
FIG. 7 is a graph of pulse duration versus color temperature relating to the present invention.

Light emitting diode array design will now be discussed. A preliminary design contains an 8×11 array of white LEDs that are not yet designated as having the blue LED plus phosphor design or the RGB design. This leaves two major design questions to be answered: (i) what is the best white LED format (blue LED+YAG phosphor or RGB); and (ii) what is the optimal array size and pitch. In devices using a pulse width modulation scheme for brightness adjustment, the answer to the first question can be answered by considering the chromaticity or color temperature shift of the two types of white LEDs as a function of duty cycle. FIG. 7 shows graph 300, which provides a summary of the test results for a direct measurement of the two types of LED formats. More specifically, graph 300 shows color temperature shift for two types of white LEDs as a function of pulse duration. As can be seen from graph 300, the color temperature of a blue+phosphor type white LED is not stable under various pulse width changes, making it challenging to use for pulse width modulation dimmed backlights. In contrast, the RGB white LED maintains very good color temperature across the entire pulse duration range tested, making it a generally preferable choice for the DGC backlight. An RGB white style LED also brings many added benefits to the backlight, including independent color control and attenuation by the DGC electronics, opening up a large range of algorithms that can be implemented, as well as the potential to remove the NVIS filter that is present in current military displays (as will be further discussed below).

While the above analysis can answer the first design question of which white LED format to use, the question of the optimal LED array size and pitch remains. In a preliminary design, the number of LEDs was selected based entirely on the required 350 fL of the display. As development continued, the inventor(s) began to appreciate the challenges of uniformity in the backlight array that were not recognized until experimental testing was commenced. Luminance uniformity (LLT) is a measure of how well the luminance remains uniform over the surface area of the screen, described by the following equation:

$$LU = 100\% \times (Lmin/Lmax) \quad \text{equation 2:}$$

where, Lmin and Lmax refer to the minimum and maximum luminance values in the screen. Flat panel display measurement (FPDM) standards typically prefer to consider the luminance non-uniformity, defined simply as (1-LU).

Figure 8:
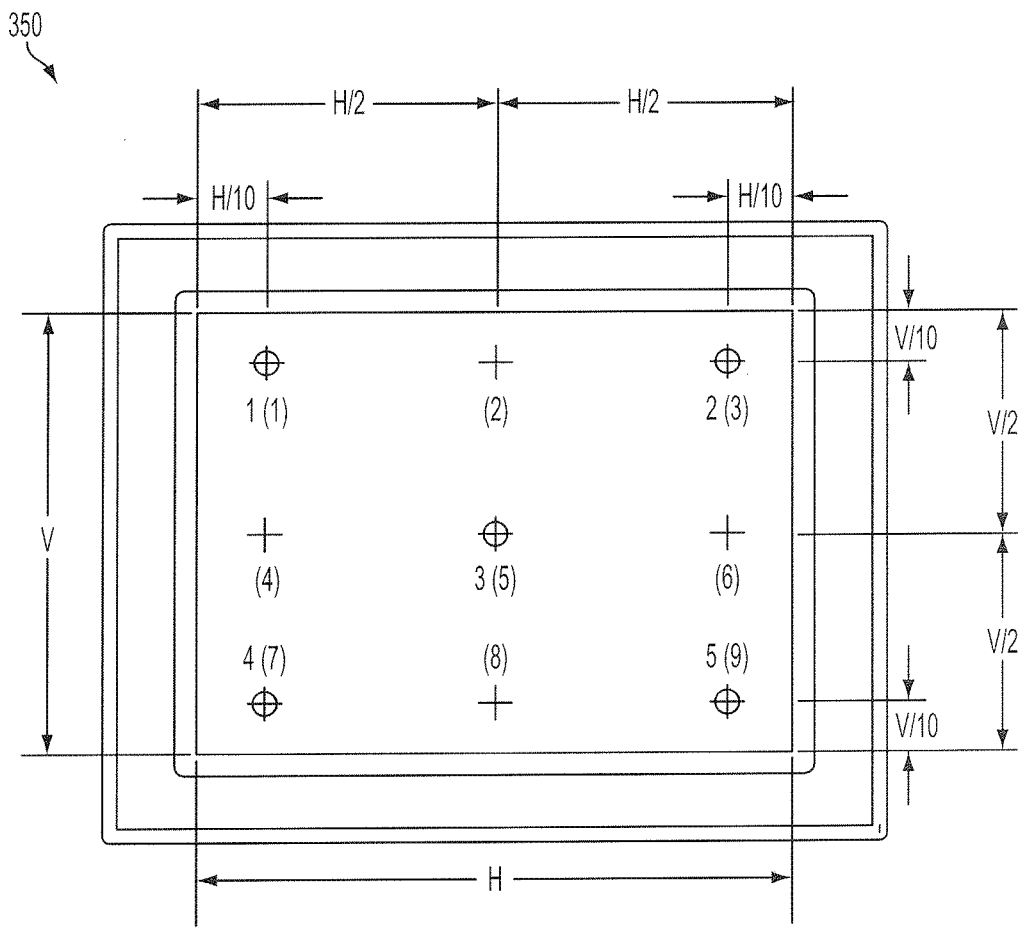
FIG. 8 is a diagram showing luminance uniformity standards for use in conjunction with the present invention.

For the purpose of designing the backlight array, various standards for uniformity were considered. MIL-L-85762A states that at any given luminance level, lighting components within a lighting system shall provide luminance such that the average ratio between lighted components shall not be greater than 2 to 1 (50%). This is a very simply standard to meet, and other, more rigorous, standards that were considered. The VESA FPDM standard uses a 9-point FPDM sampling to assess uniformity, as described in diagram 350 shown in FIG. 8. Diagram 350 shows nine points used in the VESA FPDM standard for measuring non-uniformity of the display. The standard requires that uniformity be >85%, thus limiting acceptable non-uniformity limited to 15%. Some embodiments of the present invention may exceed the requirements of the VESA FPDM standard, which is generally advantageous.

Figure 9:
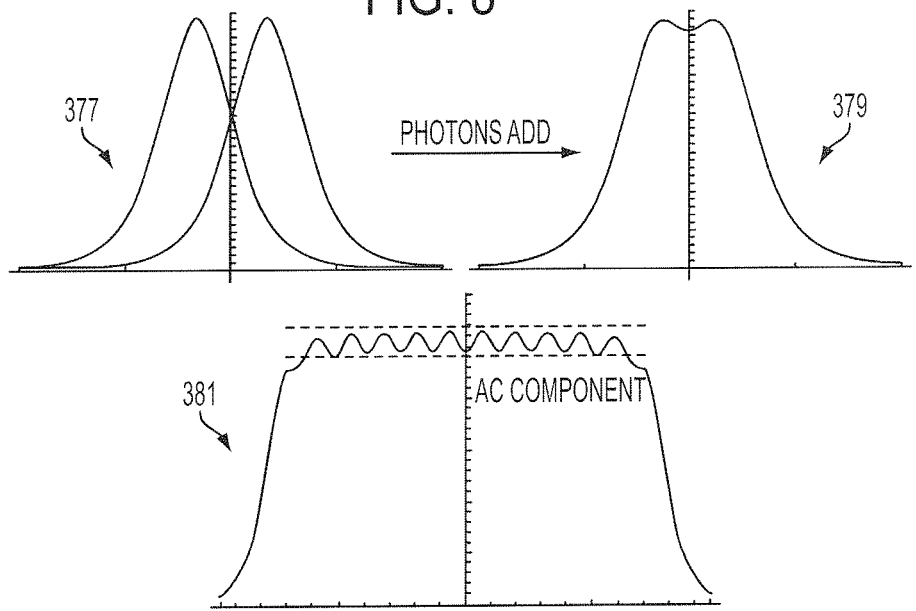
FIG. 9 is a set of graphs used to develop embodiments of the present invention.

Rather than making dozens of different displays and then measuring their uniformity, a mathematical model was developed. This mathematical model enables the designer to hone in on an optimal design very rapidly. An accurate modeling design will require some refinement effort, but can be accomplished by those of skill in the art. Initially the model was made to look at uniformity of a given array with a specific lattice (square, hexagonal, etc.) and spacing. The concept of the model was to take the experimentally determined point spread function from a single LED and to use the software to mathematically determine the resultant luminance distribution across a surface. This technique is shown in graphs 377, 379, 381 of FIG. 9. These graphs show the dependence of luminance level as a function of position for multiple LEDs.

Left top graph 377 shows the overlay of the point spread function from two LEDs that are spaced apart. The luminance of each are additive, resulting in a luminance distribution as shown in graph 379. Upon placement of multiple LEDs on a regular spacing (shown in one dimension the FIG. 9), one gets a total luminance slice from the array that shows a slight AC component due to local variations from each LED in the array. The key to maximizing luminance uniformity is to minimize these AC fluctuations. As the model was further developed, the ability to incorporate the impact of a diffuser film at a given stand-off distance was added. Two dimensional example outputs from the developed software are shown in FIG. 10 (square lattice) and FIG. 11 (hexagonal lattice). FIGS. 10 and 11 show snapshots 400, 425 from the developed modeling package for LED array and diffuser design. Snapshot 440 includes graph 402 and snapshot 427 includes graph 427. The number at the right of each graph 402, 427 represents the non-uniformity as a percentage. As can be seen, for a 14 mm pitch, both square and hexagonal lattices result in ~25% non-uniformity. Through additional modeling, diffuser stack and LED array design that had a VESA non-uniformity of only 14% was realized, as shown in graph 450 of FIG. 12A. Graph 450 shows a modeled uniformity surface map for an optimized diffuser film and LED array.

Through design efforts, an optimal pitch and number of LEDs for the two dimensional backlight array were identified. Specifically, a 9×12 array was determined to be optimal with an 18 mm pitch on a square lattice. While inside the central region of the array 100% uniformity is maintained, an additional technical challenge was identified. It was discovered that for a two dimensional array, significant edge effects occur around the perimeter. This realization stimulated interest in looking for methods to mitigate this potential shortcoming. It should be noted, however, that the display design of FIG. 12A would pass all uniformity tests since they are centrally weighted, but it was desired to make even more uniformly lit designs that exceed currently-conventional requirements given the significance of high quality image clarity and brightness for military applications.

Figure 12A:
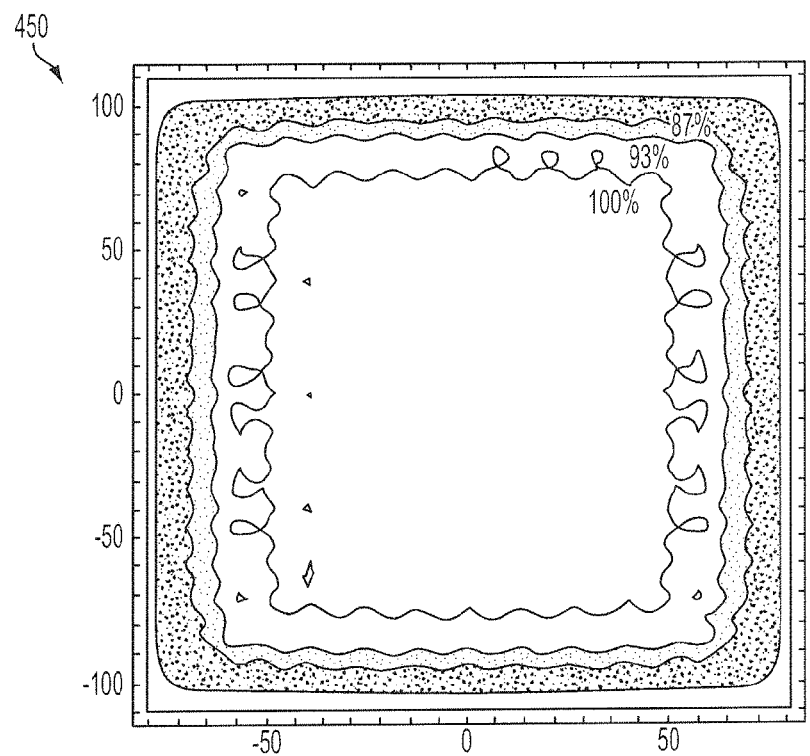
FIG. 12A is a screenshot used to develop embodiments of the present invention.
Figure 12B:
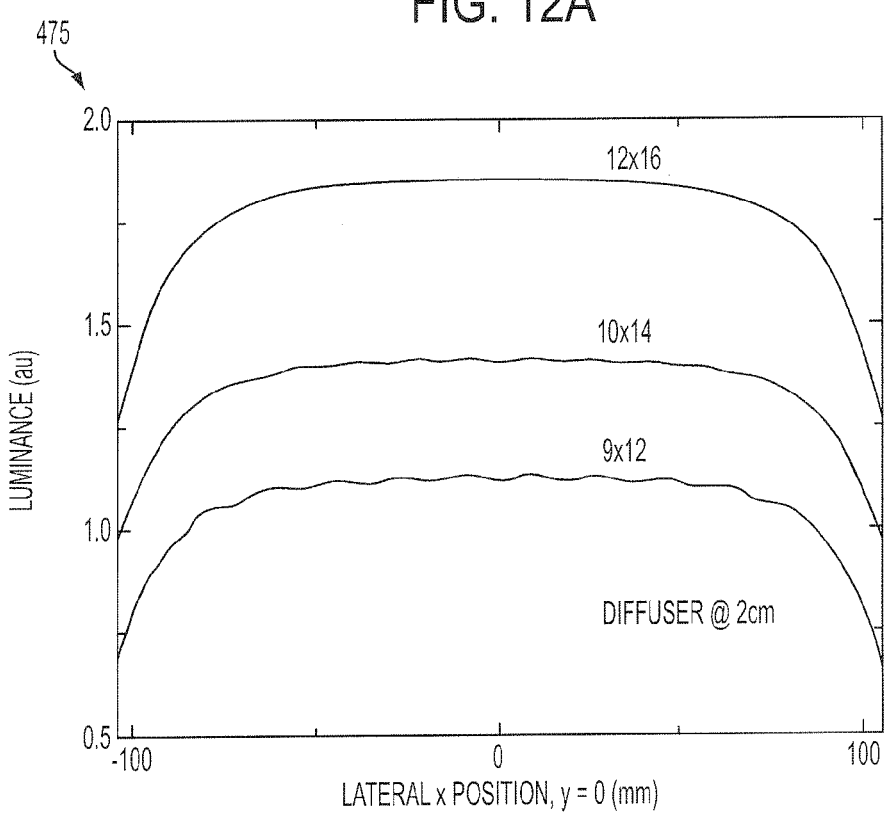
FIG. 12B is a graph used to develop embodiments of the present invention.

The mitigation of perimeter non-uniformity, shown in FIG. 12A, will now be discussed. First, in order to better understand the phenomenon of edge non-uniformity, the luminance uniformity for a variety of two dimensional arrays was compared and their uniformity as a function of pitch was determined with a diffuser. This is shown in FIG. 12B at graph 475. Graph 475 represents luminance as a function of lateral position for various array sizes. It was found was that going to a higher number of LEDs above the 9×12 optimum only increases luminance, but does not have a measurable impact on the edge effects. A summary of the results obtained through modeling in provided in the following table 1 which shows a summary of modeling data for various LED array sizes and pitches:

| LED Array Config. | Square Pitch (mm) | ADF Sampled Nonuniformity | Reference |
|---|---|---|---|
| 12 × 16 | 14 | 16.5542 | 16.0571 |
|  | 14.25 | 15.02.16 | 16.0274 |
|  | 14.5 | 13.6533 | 15.8935 |
| 10 × 14 | 16 | 19.347 | 23.5177 |
|  | 16.25 | 17.8606 | 23.3008 |
|  | 16.5 | 16.5192 | 24.3304 |
| 9 × 12 | 18.5 | 20.7744 | 32.5473 |
|  | 18.25 | 19.0684 | 32.2871 |
|  | 18 | 17.4965 | 32.8515 |

Figure 13:
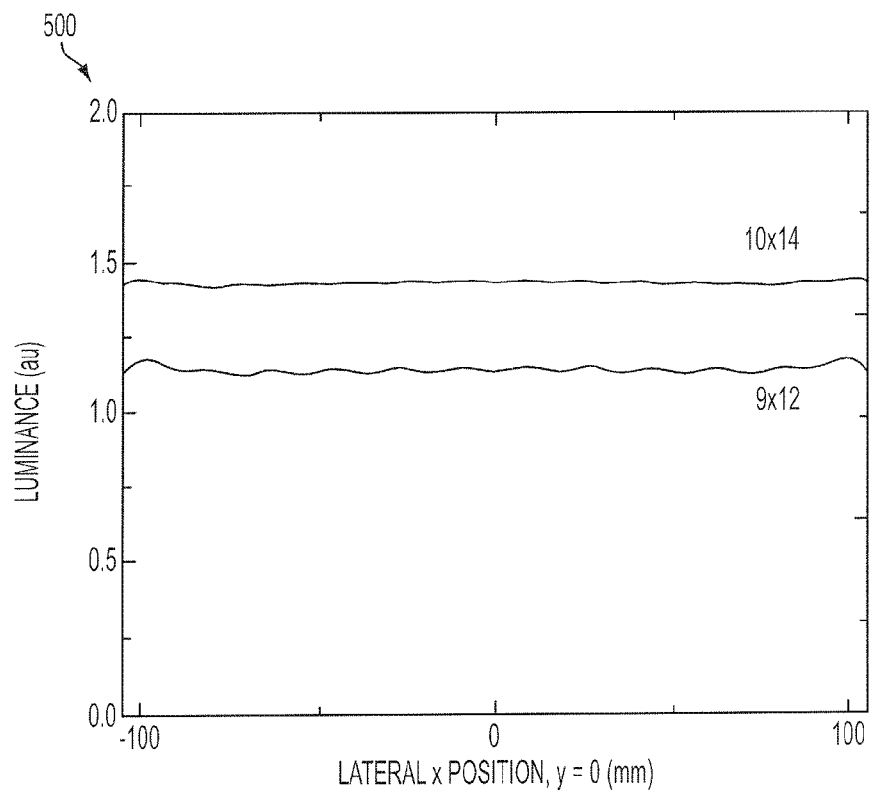
FIG. 13 is a graph used to develop embodiments of the present invention.

As mentioned above, uniformity is only mildly improved within the central ADF sampled central region of the display, but the edge uniformity remains unaffected as was shown in graph 475 of FIG. 12B. After consideration of several options, it was determined that the most effective and economical method of mitigating the edge non-uniformity was to add additional LEDs to the edges (excluding corners). To test this potential solution, a similar simulation as shown in FIG. 12B was made, but with an extra row and column of LEDs around the perimeter of the array. Two sizes of arrays were tested for the sake of comparison: 9×12 and 10×14. A line cut of the two dimensional luminance uniformity data with a single diffuser sheet is provided at graph 500 of FIG. 13. Graph 500 shows line cut of luminance across the display with extra row/column LEDs for two array sizes. As clearly evident in FIG. 13, the uniformity of the display is very tight. The extra row and column of LEDs around the perimeter effectively raises the shoulders of the luminance distribution profiles, removing the non-uniformities that were present at the edges in FIGS. 12A and 12B. In this scheme, the edge LEDs are made redundant with the driving values sent to their adjacent LED in the next row/column. A summary of the uniformity data from the modeling of the two array sizes (9×12 and 10×14) is provided in Table 2 which shows a summary of uniformity data for two array sizes when an extra row/column is added around the perimeter of the LED array:

| LED Array Configuration | Pitch (mm) | VESA Sampled Non-uniformity | Total Non-uniformity | Total Area (in²) |
|---|---|---|---|---|
| 10 × 14 + 10(2) + 14(2) | 16 | 3.0 | 13.0 | 6.5 × 8.86 |
| 9 × 12 + 9(2) + 12(2) | 18 | 4.0 | 17.0 | 6.7 × 8.70 |

From the modeling effort, it was determined that as little as 4% VESA standard luminance non-uniformity within the LED array using a 9×12 array with additional LEDs around the perimeter can be achieved. This effectively mitigates the edge effect issues that plagued the prior two dimensional design.

Figure 15:
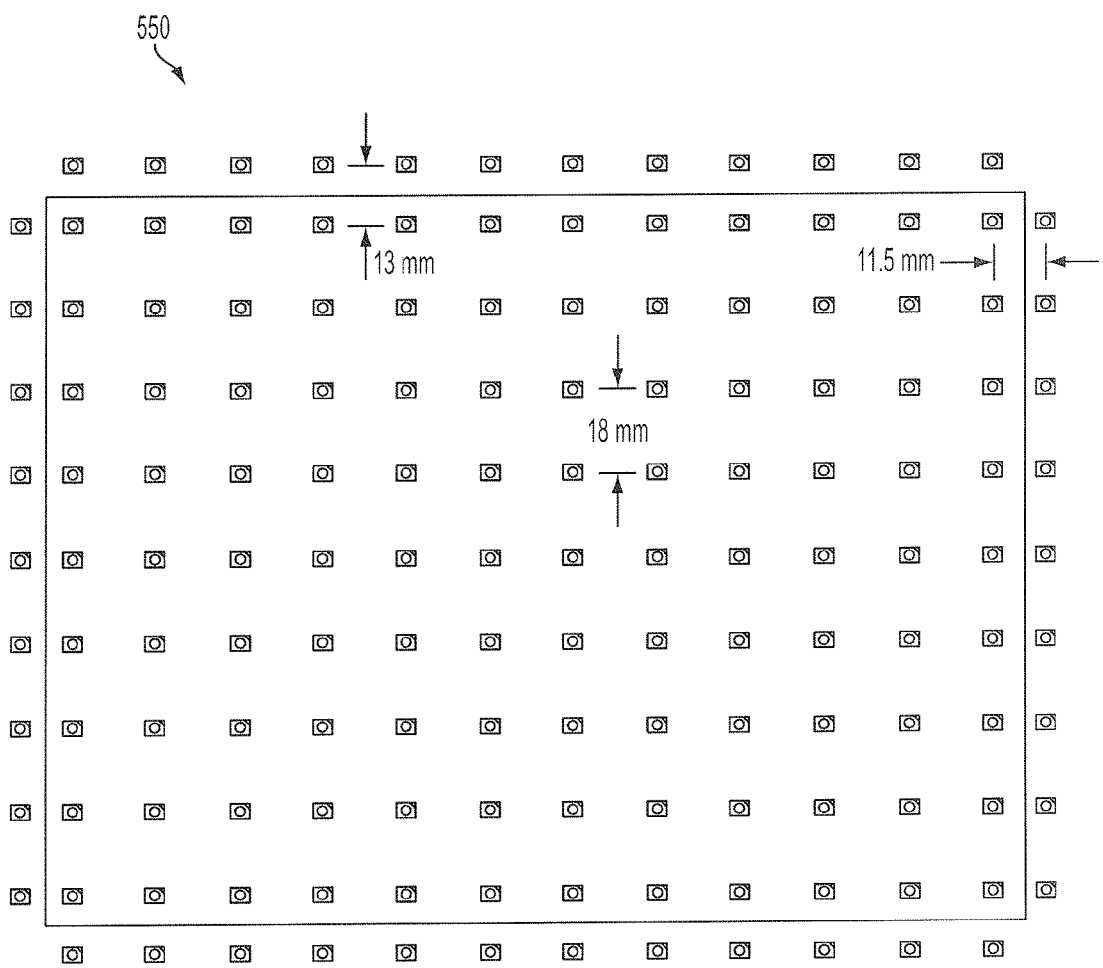
FIG. 15 is a diagram used to develop embodiments of the present invention.

Diagram 550 of FIG. 15 provides the actual two dimensional LED display design for the DGC backlight assuming a single diffuser sheet. Diagram 550 shows a layout of a 150 RGB white LED backlight showing placement of perimeter LEDs. The array consists of a 9×12 internal area that sits within the normal display area of the AMLCD, with additional LEDs placed along the perimeter of the array to circumvent the edge effects. As indicated above, these perimeter LEDs are driven identically to those adjacent to them just inside the normal display area. The lateral offset of the extra rows is 11.5 mm, and the vertical offset of the two extra columns is 13 mm.

Methods and devices that allow removing of external NVIS filter, while still allowing NV capability will now be discussed. Removal of the external NVIS filter from the display would be of high value. Such filters reduce transmission and add cost to the display. When an RGB approach to white lighting is used according to the present invention, there is created a unique potential over standard blue LED+phosphor designs to avoid emission within the gain region of Class A and Class B NVIS goggles. Graph 525 of FIG. 14 provides an overlay of a standard red LED with the gain curves for Class A and Class B NVIS goggles.

Figure 14:
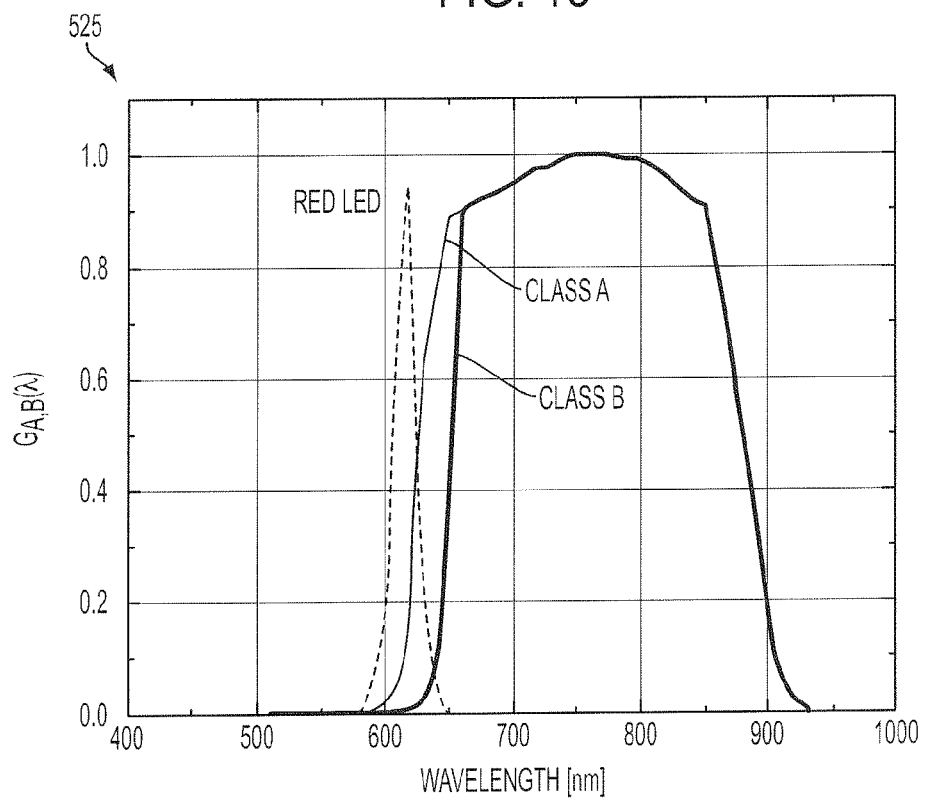
FIG. 14 is a graph used to develop embodiments of the present invention.

Graph 525 of FIG. 14 shows an overlay of NVIS gain curves for Class A and C with the emission of a standard red LED. What is evident in graph 525 is that there is minimal overlap between the red LED emission and Class B gain. If a display device uses a 605 nm red LED, rather than a standard 626 nm red LED, this could shift the longer wavelength tail of the red LED emission out of the Class B gain, and reduce intersection with the Class A gain curve. Further shift in the red LED towards amber wavelengths would result in little to no overlap with the gain curves. Thus, there is a potential to replace the standard 626 nm red LED with a shorter wavelength, resulting in no pick-up of the NVIS goggles from the LED source. This is believed to be impossible for a standard blue LED+phosphor approach since the longer wavelength emission of such white LEDs penetrates significantly into the gain regions of both Class A and Class B equipment. The trade-off in shifting the wavelength of the LEDs is that it would result in a reduced color gamut with less saturation of reds. A potential method to benefit from a complete color gamut under normal operation is to move from a RGB white LED to a RR'GB white LED, where R' denotes a shorter wavelength red-amber LED chip in the package that does not have emission within the gain region of the NVIS equipment. In this case, the white LED would have four chips, with the R being used during standard operational conditions, maintaining a complete color gamut, and the R' chip being used during night and NVIS operational conditions. The DGC electronics would simply switch from using the standard R chip to the R' chip under night mode. In this manner, no additional algorithm or driver chips would be necessary other than that required to drive a transistor array to switch to the R' LEDs.

Video content processing will now be further discussed, specifically the FPGA video content processing design of a prototype for the NAVAIR (Naval Air Systems Command) Smart Display Backlighting project (herein sometimes referred to as the "Prototype").

The design platform employs Altera's FPGA solution. StratixIII is the FPGA product of choice, along with design software suite provided by Altera. (Note: the term(s) "Altera" and/or "StratixIII" may be subject to trademark rights in various jurisdictions throughout the world and are used here only in reference to the entities, products or services properly denominated by the marks to the extent that such trademark rights may exist.) A StratixIII FPGA development board for design space exploration and prototype verification was used, specifically the design software version 8.1. QuartusII is the center piece of all software involved in FPGA development in the Prototype. (Note: the term(s) "QuartusII" may be subject to trademark rights in various jurisdictions throughout the world and are used here only in reference to the entities, products or services properly denominated by the marks to the extent that such trademark rights may exist.) It performs design source compilation, FPGA placement and routing, timing analysis, and FPGA programming file generation. Other software in the Prototype generally play supporting roles to QuartusII.

SOPC (System On a Programmable Chip) Builder provides a user-friendly GUI to rapidly prototype a system with both Altera's IP cores and custom logic. Video processing algorithms are implemented in NIOSII (Altera's embedded processor) IDE. Mentor Graphic provides a special version of ModelSim hardware simulation software to Altera. This simulator is used to verify the FPGA design. SignalTapII is an integrated logic analyzer released by Altera. It injects hardware logic additional to the design for recording and extracting run time signals in the FPGA chip. The extracted signals can be transmitted to a host PC connected to the development board via the FPGA download cable. (Note: the term(s) "SOPC Builder," "Mentor Graphic," "ModelSim," and/or "SignalTapII" may be subject to trademark rights in various jurisdictions throughout the world and are used here only in reference to the entities, products or services properly denominated by the marks to the extent that such trademark rights may exist.)

As discussed above in connection with FIG. 4, the design also employs several Altera IP cores, among which are respectively included in: embedded microprocessor NIOSII sub-sub-module 224; on-chip memory sub-sub-modules 236, 238, 240; SPI communication sub-sub-module 232 (also sometimes referred to as SPI transmission sub-sub-module); count-down timer working as watchdog sub-sub-module 226; and PLL generating SOPC system clock sub-sub-module 234.

Video input assumptions and sub-sampling will now be discussed. The design assumes a digitized 1024 by 768 pixel stream, in the format of parallel RGB, 10 bits per color channel at most, with separated vertical and horizontal synchronization signals, is coming into the FPGA at 60 frames per second. To be clear, this document uses terminology discussed in the following paragraph to describe subset of the 1024 by 768 pixels in one frame.

Figure 16:
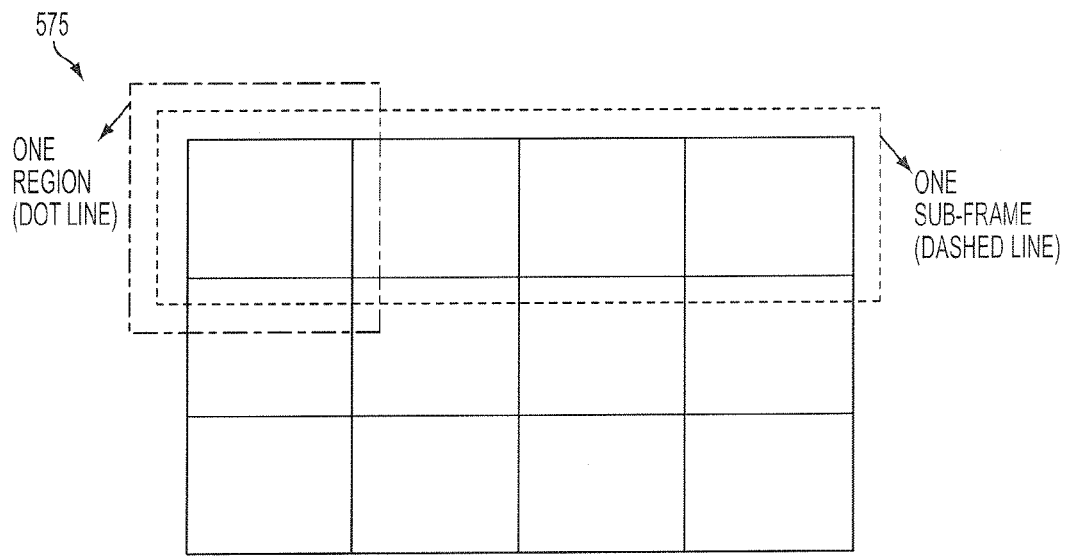
FIG. 16 is a diagram used to clarify terminology related to the present invention.

One sub-frame is several consecutive rows of pixels within a frame. The number of pixel rows is determined by the number of rows of backlighting LEDs. For example, if there are eight rows of LEDs, then a sub-frame consists of 96 rows, as 768 divided by 8. One region is several consecutive columns of a sub-frame. The number of columns of a region is determined by the number of LEDs in one row of LEDs. For example, if there are 16 LEDs per row, the number of columns of a region is 64, as 1024 divided by 16. Take the two examples together, one region has 64 by 96 pixels, all these pixels contribute to the control of one single LED's brightness. Diagram 575 shown in FIG. 16 graphically shows how this terminology is applied.

A performance test of NIOSII and the hardware system indicates that due to the microprocessor speed limit (slightly over 200 MHz), the number of total pixel within each frame must be reduced by a factor to allow the system to process timely; such reduction is achieved by two phase of sub-sampling. The system first "merges" four adjacent pixels by calculating their average. Then the system records the middle row of each three consecutive rows, from the second row, the fifth, and the eighth, and so on, up to the 767th row of a frame. Therefore, the achieved pixel reduction factor is 12 (4 horizontally multiplied by 3 vertically). Detailed implementation of sub-sampling is described below.

Figure 17:
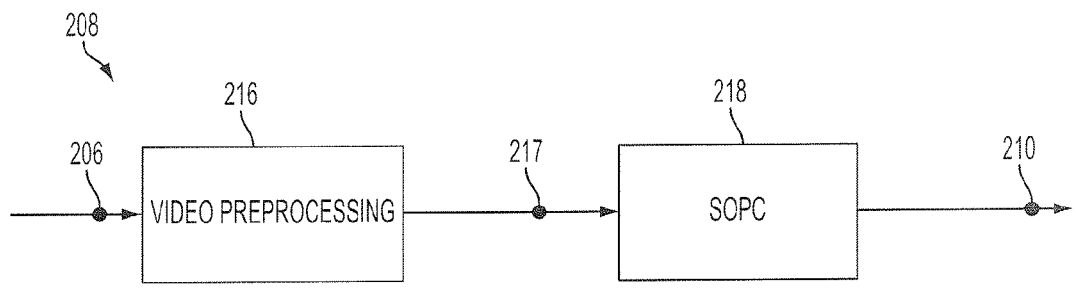
FIG. 17 is a of a portion of the first embodiment electronics sub-system.

Hardware design will now be discussed. To avoid ambiguity, the word "hardware" appearing in this document refers only to the video content processing logic, which entirely resides on the FPGA chip. Supporting circuitry of the FPGA chip is beyond this document's scope. The hardware system has two major components: the video preprocessing unit and the SOPC system. The preprocessing unit merges four adjacent pixels and generates pixel row address, column address, and a memory chip selection signal, indicating which one of two on-chip memory modules should be filled with incoming pixel data. The SOPC system reads pixel data out from on-chip memory modules, computes regional brightness on each of the three color channels, and sends the result via SPI protocol to the LED driving signal generation circuitry. Diagram 208 of FIG. 17 shows video content processing module (previously discussed above in connection with FIGS. 3 and 4) including: video input communication path 206; video pre-processing sub-module 216; preprocessed video data communication path 617; SOPC sub-module 218; and brightness information communication path 210. Diagram 208 is an overview of the video content processing logics.

Figure 18:
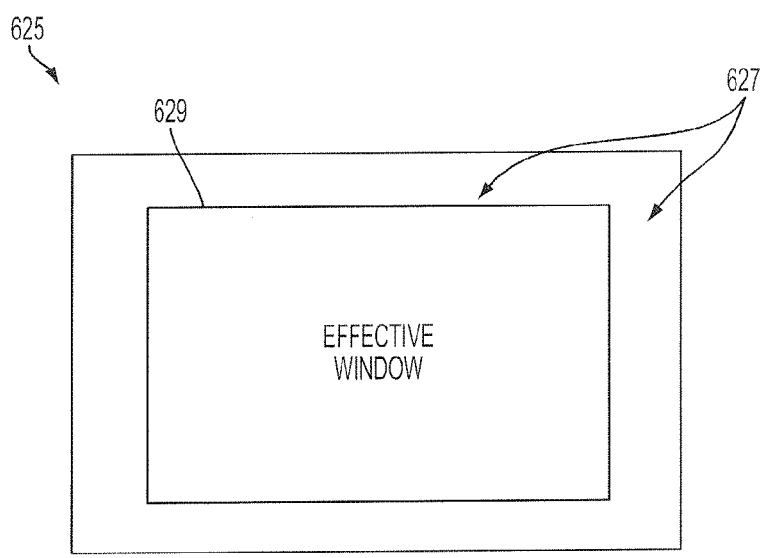
FIG. 18 is a diagram useful for explaining processing according to the present invention.

As shown in FIG. 4, the system includes: a VGA filter module 204 (which is specific to the VGA interface and is labeled in FIG. 4 as "video decoder"); universal sub-sampling sub-module 612 (which is denominated in FIG. 4 as a video preprocessing sub-sub-module); and SOPC system sub-module 218. The universal sampling sub-module 216 includes: pixel merge sub-sub-module 220; and address generation sub-sub-module 222. According to the VGA standard, a frame being transmitted is larger than a frame that appears on the display. For example, if the display resolution is 1024 by 768, the actual number of transmitted pixels is 1344 by 806. The extra pixels are all blank and do not affect the content of the frame. The 1024 by 768 pixels form an effective window with extra pixels around them. Diagram 625 of FIG. 18 (including effective window 629 and blank pixel region 627) illustrates the concept of effective window.

The VGA filter is designed to allow only effective pixels to be sent to the universal sub-sampling module. Pixel filtering within one row is achieved through triggering a counter by the pixel clock. A pixel valid signal is asserted only when the value of this counter is within an effective range. The upper and lower bound of the range is parameterized since these numbers are flexible in the VGA standard. Line filtering within a frame is implemented in the same fashion but using HSYNC to trigger the counter. The pixel valid signal and line valid signal are ANDed together resulting in the vga_data_valid output signal. Also, by using counters HSYNC and VSYNC, outputs are delayed to the first effective pixel of one row or one frame respectively.

In the first stage of sub-sampling, pixel merge sub-sub-module 220 calculates the average of four adjacent pixels on each of the three color channels through a state machine. It also divides the pixel clock by a factor of 4. Moreover, there is a 2-bit saturating reset counter which increments at vertical synchronization. Only when the reset counter reaches a pre-defined value, the divided pixel clock output is enabled. Otherwise, it remains in logical low and thus cannot drive the address generation module. This waste-of-frame (2 to 3) capability allows a time period long enough for SOPC system initialization.

The merged pixel data and divided pixel clock are further sent to the second sub-sampling stage, which is address generation sub-sub-module and is also responsible for generating both row and column addresses of pixel and the memory chip selection signal as well. Sub-sub-module 616 maintains two 10-bit counters for address and two single bit registers for data enable and chip selection. The column address counter is incremented at positive edge of pixel clock and is reset at horizontal synchronization. The row address counter is incremented at active horizontal synchronization and is reset at vertical synchronization. The data enable is set to logical high when the remainder of dividing row address by 3 is 1. Thus only one row in three consecutive rows is sent to SOPC system sub-module 218. The chip selection flips at the end of each sub-frame. That is, when row address corresponds to the last row of a sub-frame and column address corresponds to the last pixel of the row at the same time.

The SOPC system is built by using several IP cores provided by Altera, and a custom logic module hand-coded in the Verilog HDL video controller. (Note: the term(s) "Verilog" may be subject to trademark rights in various jurisdictions throughout the world and are used here only in reference to the entities, products or services properly denominated by the marks to the extent that such trademark rights may exist.) SOPC system sub-module 218 is shown in FIG. 4 and includes: an embedded microprocessor NIOSII sub-sub-module 224; three on-chip memory modules 236, 238, 240; PLL sub-sub-module 234; count-down timer (also call watchdog sub-sub-module 226); SPI transmitter sub-sub-module 232; and system ID register sub-sub-module 228.

Figure 19:
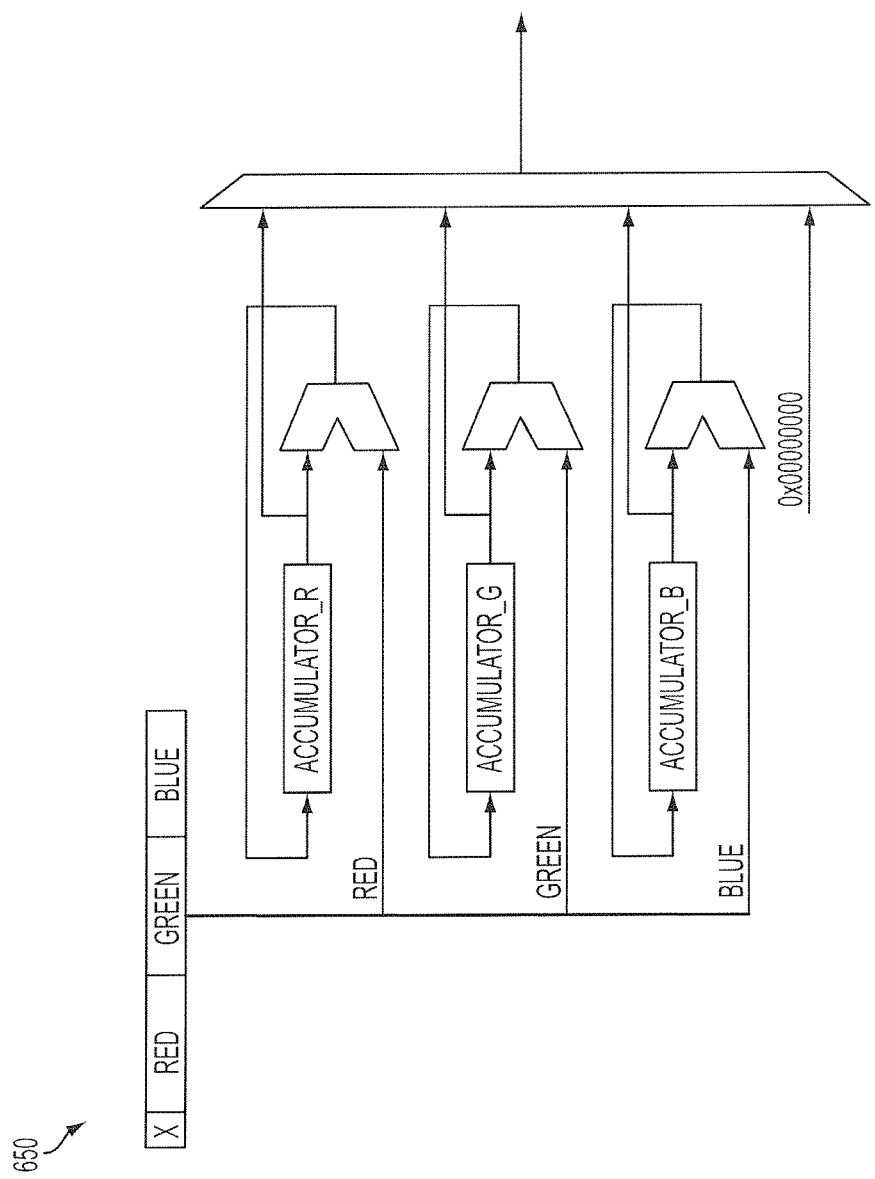
FIG. 19 is a diagram of a vector adder extension for use with the first embodiment electronics sub-system.

The NIOSII processor is extended with a hand coded vector adder through its custom instruction capability. The NIOSII processor is configured to the "fast" version with hardware multiply and divide options enabled to accelerate certain software operations. It has a separated instruction cache (4 KB) and a data cache (2 KB). The JTAG (Joint Test Action Group) debug module associated with the CPU is level 3 to support a SignalTapII logic analyzer. A vector addition instruction is added to the NIOSII to accelerate video content processing. At the moment, both implemented video content processing algorithms are required to calculate the sum of a number of pixels and then the averages. Since the three color channels are packed in a 32-bit word, in order to process one pixel the processor needs to first separate color data and then perform addition on each color. This results in a sequence of more than ten instructions and they are serially executed without vector addition, taking a large bulk of processor time. The vector adder, on the other hand, performs color separation and addition in parallel by hardware. It only needs the pixel word and function code from the NIOSII, reducing the processing of a pixel to one single instruction. Block diagram 650 of FIG. 19 illustrates vector adder extension design.

The size of all three on-chip memory sub-sub-modules 236, 238, 240 are all 32 KB. Two of them, data0 and data1, implement double buffering of incoming pixel data. The first sub-frame is written into data0 238. When data0 238 is filled, the CPU reads pixel data out from it and process this sub-frame. Meanwhile, the second sub-frame is written into data1 240. When the data1 module is filled, the CPU is done with the first sub-frame and switches to the data1 module. At this juncture, the data0 module is ready for being written again. In the Prototype, one sub-frame written into on-chip memory contains 8192 (1024/4*768/3 divided by 8, assuming 8 rows of LEDs) pixels and each pixel occupies 4 bytes of memory. If there are more rows of LEDs, very possibly this will be the case, the requirement of on-chip memory size will be reduced from 32 KB. The address range of the two buffers are 0x00000 to 0x07fff and 0x20000 to 0x27fff respectively, using 18 bits address width to allow expanding these buffers to a larger size. Even if the video resolution is increased, the FPGA chip currently in use can support 64 KB per memory module. The last piece of on-chip memory (code 236) is where the video processing software resides. The current version of software occupies only 6 KB after compilation.

The FPGA development board currently in use has a 50 MHz oscillator. PLL 234 raises this clock frequency to the 200 MHz frequency at which the system operates. The PLL sub-sub-module uses the simplest configuration of this IP and does not require any run time control.

The count-down timer 226 in the system works in a watch dog manner. That is, when the timer reaches zero, a reset signal is sent to the whole SOPC system. When CPU writes the timer's control register, it is reset to a predefined value. The time period used is 2 ms, slightly larger than the period of two sub-frames coming into the system.

The brightness information result from video processing is sent out from the system over the SPI protocol. SPI transmitter sub-sub-module 232 is configured in master mode at a 4 MHz transmitting clock. It is also configured to interact with only one SPI slave using eight bits per datum.

System ID register sub-sub-module 228 has no affect on functionality of the system. It is included according to Altera's recommendation. The value of this register is a random number defined at SOPC system generation time and cannot be modified at run time. The NIOSII IDE includes this value in its compiled software. When software binary code is downloaded to or compiled together with the hardware system, this value is compared against the system ID register to ensure that the software is compiled for the current version of hardware.

The hand-coded video controller 230 is the sub-sub-module of the SOPC system sub-module that connects to the video preprocessing sub-module 216, as shown in FIG. 4. It writes pixel data into on-chip data buffers (data0 and data1) in double-buffering fashion. It also contains a status output for the software to determine which on-chip data buffer is ready to be read and which sub-frame does the ready buffer hold. Moreover, the video controller sends an interrupt signal to the CPU upon a buffer is filled. Another responsibility of this component is to generate address and control signal of the on-chip buffers. Firstly, the video controller detects a rising edge of pixel clock and asserts a vid_posedge signal. Since the pixel clock (tens of MHz) is slower than the SOPC system clock, this signal will only be held for one SOPC clock cycle. The vid_posedge and input signal CTRL_DE is ANDed together; when the output of this AND gate is logical true, a new pixel in a row of interest is received by the video controller from video preprocessing sub-module 216, as shown in FIG. 4. The video controller maintains a 15-bit counter which is incremented by 1 at logical true (which holds for only one SOPC clock cycle) of the above-mentioned AND gate, and is reset when its value equals the number of pixels in a sub-sampled sub-frame. The value of this counter is left shifted by 2 bits and concatenated after the chip selection signal, forming an 18-bit byte address for on-chip buffers. The write signal of on-chip buffers is also asserted at logical true of the AND gate, allowing a pixel to be written into a buffer. There is also a 2-bit register flipping both bits upon a flip of the chip selection signal. The initial value of this register is 00 and it is set to 01 upon the first flip of the chip selection signal. This register indicates which on-chip buffer is filled and ready to be processed by the CPU. For example, 01 means data0 is ready. The value of input signal row_addr is divided by the number of rows within a sub-frame, forming a 3-bit row address of the backlighting LEDs. This 3-bit LED row address is concatenated before the above-mentioned 2-bit register, forming the 5-bit status output to be read by the CPU. Finally, the interrupt signal is asserted at the end of each sub-frame and de-asserted on either the CPU writes to the video controller's control register or 32 pixels of the new sub-frame are received. The self-de-asserting capability is chosen to ensure that the CPU can only respond to an interrupt request early enough to allow sufficient time for video processing and sending the results via SPI sub-sub-module 232, as shown in FIG. 4.

As mentioned above, FIG. 4 is a detailed block diagram hardware design, showing all logic blocks introduced in this portion of the discussion and the connections among them, including video content processing logics.

Software design and program structure will now be discussed. The video processing software follows a typical work-on-interrupt manner. The main program first registers the interrupt handler and initializes the watchdog. Then it enters a never-ending empty while loop, doing nothing except feeding the watchdog. During this loop, interrupt requests happen and the program in-execution is shifted to the interrupt handler.

The interrupt handler first disables the same type of interrupt, preventing embedded interrupt of buffer ready, which can easily cause synchronization issues. It then clears the interrupt bit in the control register of the video controller, reads the its status output so the program can determine which on-chip buffer to read and which sub-frame is in that buffer. After that, the program reads pixels data from the ready buffer and calculated average brightness for each of RGB color channels of every region within that frame. The result is then filled into a SPI packet for transmission. The first byte of the SPI packet is the sub-frame number as the backlighting LED row address. The following bytes are average brightness of Red channel of the LEDs of this sub-frame, then that of Green and Blue channel. Since the design assumes 10-bit data per channel, the result is right shifted by two bits before filled into a SPI packet. After a SPI packet is ready, the interrupt handler sends a command to the SPI module for transmission. When SPI transmission is finished, the interrupt handler feeds the watchdog, enables the same type of interrupt, and returns to the empty loop in the main program. FIG. 5, discussed above, is the flow chart of the video content processing software.

Video content processing algorithms will now be discussed. Thus far, two video content processing algorithms have been implemented. The first is regional pixel value averaging. With vector addition, the processing time of pixel averaging algorithms is reduced to less than half that of the serial version. More importantly, this allows precious time to be used by more complex video content processing algorithms.

The second is histogram equalization. To be precise, histogram, cumulative distribution function and normalization is computed at LED brightness level, in another word, the regional averages. At each sub-frame, the algorithm updates its regional averages and uses these values with previous computed and stored averages of other sub-frames to form a LED picture for processing. FIG. 6, discussed above, is a block diagram of Interrupt Handler module referenced in FIG. 5, giving the steps of video content processing algorithms. Note that the regional average method only has the first step.

It will be understood that FPGA on-board verification will sometimes be part of the design effort in designing systems and methods according to the present invention. One typical first test configuration is to have a Verilog coded video pattern generator connected to the video content processing system and download such configuration onto the FPGA chip. With this pseudo video input, correct waveforms are observed on both oscilloscope and SignalTapII; timing of SPI output, along with signals inside FPGA, are also verified. Such results can be used to validate the functionality and performance of the video content processing system. A typical second test configuration is to use real video input and repeat the experiments that have been done in the first configuration. When CLK, VS and HS are connected, fast switching color data do not disrupt these signals. With this partial connection, it can be determined whether expected results have been obtained.

For typical further testing, a DVI decoder daughter card supplied by Terasic Technologies can be used. (Note: the term(s) "Terasic" may be subject to trademark rights in various jurisdictions throughout the world and are used here only in reference to the entities, products or services properly denominated by the marks to the extent that such trademark rights may exist.) If the signal waveforms are clean but the input video clock cannot drive any internal register of the FPGA, then this problem may be due to that the clock signal is not properly expanded by the QuartusII when compiling the design. This problem can generally be corrected after upgrade the FPGA design suite to version 9.1. The FPGA outputs correct brightness data according to a varying video input. In this way, the video processing system can be validated by dynamic incoming video content.

DEFINITIONS

Any and all published documents mentioned herein shall be considered to be incorporated by reference, in their respective entireties. The following definitions are provided for claim construction purposes:

Present invention: means "at least some embodiments of the present invention," and the use of the term "present invention" in connection with some feature described herein shall not mean that all claimed embodiments (see DEFINITIONS section) include the referenced feature(s).

Embodiment: a machine, manufacture, system, method, process and/or composition that may (not must) be within the scope of a present or future patent claim of this patent document; often, an "embodiment" will be within the scope of at least some of the originally filed claims and will also end up being within the scope of at least some of the claims as issued (after the claims have been developed through the process of patent prosecution), but this is not necessarily always the case; for example, an "embodiment" might be covered by neither the originally filed claims, nor the claims as issued, despite the description of the "embodiment" as an "embodiment."

First, second, third, etc. ("ordinals"): Unless otherwise noted, ordinals only serve to distinguish or identify (e.g., various members of a group); the mere use of ordinals shall not be taken to necessarily imply order (for example, time order, space order).

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (ii) in a single proximity within a larger piece of software code; (iii) located within a single piece of software code; (iv) located in a single storage device, memory or medium; (v) mechanically connected; (vi) electrically connected; and/or (vii) connected in data communication.

Primary colors: any set of three colors that can be combined to make white light for the purposes of backlit video displays; the most common set of primary colors is RGB, but "primary colors" are not necessarily limited to that.

Unless otherwise explicitly provided in the claim language, steps in method or process claims need only be performed that they happen to be set forth in the claim only to the extent that impossibility or extreme feasibility problems dictate that the recited step order be used. This broad interpretation with respect to step order is to be used regardless of alternative time ordering (that is, time ordering of the claimed steps that is different than the order of recitation in the claim) is particularly mentioned or discussed in this document. Any step order discussed in the above specification, and/or based upon order of step recitation in a claim, shall be considered as required by a method claim only if: (i) the step order is explicitly set forth in the words of the method claim itself; and/or (ii) it would be substantially impossible to perform the method in a different order. Unless otherwise specified in the method claims themselves, steps may be performed simultaneously or in any sort of temporally overlapping manner. Also, when any sort of time ordering is explicitly set forth in a method claim, the time ordering claim language shall not be taken as an implicit limitation on whether claimed steps are immediately consecutive in time, or as an implicit limitation against intervening steps.

What is claimed is:

1. A backlight assembly comprising:
   a plurality of backlights;
   a backlight supporting member; and
   a control system;
   wherein:
   the plurality of backlights are spaced apart on and mechanically connected to the backlight supporting member over a plurality of backlight locations;
   the backlights located at each backlight location include a backlight set;
   each backlight set comprises a first backlight, a second backlight, third backlight and a fourth backlight;
   the first, second and third backlight of each backlight set has a different primary color of a set of primary colors;
   the fourth backlight of each set of backlights has the same primary color as the third backlight, but has a different characteristic wavelength within the range of the primary color of the third backlight of its set; and
   the control system is structured, connected and/or programmed to:
   be in data communication with each of the plurality of backlight, and
   independently and selectively control the third and fourth backlights of each backlight set in a manner depending upon depending up a predetermined display mode.

2. The assembly of claim 1 wherein the control system is further structured, connected and/or programmed to selectively control the plurality of backlights at any given time according to one the following two display modes: regular and night vision.

3. The assembly of claim 2 wherein:
   for each set of backlights:
   the first backlight is in the blue range,
   the second backlight is in the green range,
   the third backlight is in the red range, the fourth backlight is in the red range and has a shorter characteristic wavelength than the third backlight; and the control system is further structured, connected and/or programmed to use the third backlight of each backlight set when operating in regular display mode and use the fourth backlight of each backlight set when operating in normal mode.

4. The assembly of claim 1 wherein the characteristic wavelength of the fourth backlight is a wavelength that will not substantially interfere with the gain wavelengths of night vision viewing equipment.

5. The assembly of claim 1 wherein each backlight of the plurality of backlights includes a light emitting diode.

* * * * *